(12) United States Patent
Ferguson

(10) Patent No.: US 8,275,001 B1
(45) Date of Patent: Sep. 25, 2012

(54) SYSTEMS AND METHODS FOR SYNCHRONIZING BACKUP RECEIVERS TO NETWORK CLOCKS

(75) Inventor: Jason R. Ferguson, Phoenix, AZ (US)

(73) Assignee: Adtran, Inc., Huntsville, AL (US)

( * ) Notice: Subject to any disclaimer, the term of this patent is extended or adjusted under 35 U.S.C. 154(b) by 351 days.

(21) Appl. No.: 12/649,854

(22) Filed: Dec. 30, 2009

(51) Int. Cl.
*H04J 3/06* (2006.01)

(52) U.S. Cl. .................................................. 370/509

(58) Field of Classification Search .......... 370/216–218, 370/225–226, 350, 503–520; 375/354–368
See application file for complete search history.

(56) References Cited

U.S. PATENT DOCUMENTS

| | | | |
|---|---|---|---|
| 6,542,754 B1 * | 4/2003 | Sayers et al. ................. | 455/502 |
| 6,754,171 B1 | 6/2004 | Bernier et al. | |
| 7,191,355 B1 | 3/2007 | Ouellette et al. | |
| 7,301,896 B2 | 11/2007 | Tateno et al. | |
| 7,424,636 B1 | 9/2008 | Grah et al. | |
| 7,468,991 B2 | 12/2008 | Bradbury et al. | |
| 7,613,212 B1 * | 11/2009 | Raz et al. ...................... | 370/510 |
| 7,742,505 B2 * | 6/2010 | Venters et al. ................ | 370/503 |
| 7,792,157 B2 * | 9/2010 | Cui et al. ...................... | 370/516 |
| 2005/0052252 A1 | 3/2005 | Galibois | |
| 2006/0139081 A1 | 6/2006 | Van Den Berg | |
| 2007/0097902 A1 * | 5/2007 | Aweya et al. ................. | 370/321 |
| 2007/0153811 A1 | 7/2007 | Venters et al. | |
| 2009/0033380 A1 | 2/2009 | McCoy | |

OTHER PUBLICATIONS

ITU-T G.8261/Y.1361, Timing and synchronization aspects in packet networks, 112 pages, Apr. 2008.*

* cited by examiner

*Primary Examiner* — Frank Duong
(74) *Attorney, Agent, or Firm* — Maynard, Cooper & Gale, PC; Jon E. Holland

(57) ABSTRACT

An interworking function (IWF) at an edge of a packet network comprises a primary receiver and a backup receiver. The primary receiver receives data packets and timing information from a packet network. The primary receiver interworks data from the data packets into a data signal that is based on a local clock signal. The primary receiver uses the timing information from the packet network to adjust the frequency of the local clock signal such that it is synchronous to a network clock signal, such as a clock signal at an IWF, referred to as the "transmitting IWF," that transmitted the data packets. In addition, the primary receiver from time-to-time provides timing information, such as a frequency control word, to the backup receiver, which uses such timing information to synchronize a clock signal of the backup receiver to the network clock signal upon an occurrence of a switchover from the primary receiver to the backup receiver. By using the timing information from the primary transceiver, the backup transceiver is able to synchronize its clock signal to the network clock signal in less time.

20 Claims, 7 Drawing Sheets

US 8,275,001 B1

SYSTEMS AND METHODS FOR SYNCHRONIZING BACKUP RECEIVERS TO NETWORK CLOCKS

RELATED ART

When packets are transmitted over a packet network, it is often desirable for the packets to transfer synchronous data signals. For example, an interworking function (IWF), referred to hereafter as a "transmitting IWF," for a packet network may receive a data signal, such as a DS1 or T1 signal, and packetize the signal's data for transmission over the packet network. An IWF, referred to hereafter as a "receiving IWF," may receive the packets and regenerate the data signal that was originally packetized by the transmitting IWF. In this regard, the receiving IWF may generate a data signal, referred to hereafter as the "regenerated data signal," that is synchronous to and contains the same data as the original data signal packetized by the transmitting IWF.

To enable the receiving IWF to provide a regenerated data signal synchronous to the original data signal, highly accurate clocks, referred to as "primary reference clocks" (PRCs), are sometimes used by the transmitting and receiving IWFs. Accordingly, each of the IWFs operates according to the same time domain. In this regard, each IWF, through its respective PRC, has access to essentially the same global timing information and can use such timing information to remain synchronous with one another. However, PRCs are relatively expensive, and each IWF may not have direct access to a PRC.

In such situations, other techniques are used for synchronization. For example, in some systems, a transmitting IWF uses a PRC signal to transmit data packets to a network. Each network node along the data path either has access to a PRC signal or is frequency-locked to a network node having access to a PRC. The receiving IWF either frequency-locks to the transmitting IWF or to one of the network nodes to generate a signal synchronous to the transmitting PRC. However, frequency-locking nodes to one another can require specialized circuitry, which is not always available.

Some packet-based approaches have been developed to enable timing information to be passed through the network without requiring intermediate nodes to be frequency-locked to one another. In such systems, the transmitting IWF often utilizes a PRC signal or a clock signal traceable to a PRC signal in order to insert, into packets, timing information, which can be used to appropriately update the timing of a clock signal in the receiving IWF in order to ensure that such signal remains synchronous to the clock signal of the transmitting IWF. Using the updated clock signal, the receiving IWF is able to provide a regenerated data signal that is synchronous to the original data signal packetized by the transmitting IWF even though the receiving IWF does not have direct access to a PRC signal.

To enhance the robustness of the communication system, it would be desirable to backup the receiver, referred to as the "primary receiver," at the receiving IWF with a redundant receiver that could be used to receive the data packets from the packet network and provide a regenerated data signal in the event of a communication problem with the primary receiver. However, it generally takes a finite amount of time for a receiver to use timing information from the transmitting IWF in order to synchronize to the clock signal of the transmitting IWF. Thus, upon a switchover from the primary receiver to a backup transceiver, synchronization with the clock signal of the transmitting IWF may be lost until the backup transceiver is able to adjust its local clock signal to be synchronous to the clock signal of the transmitting IWF. Accordingly, a switchover may disrupt the timing of the regenerated data signal at the receiving IWF such that it temporarily loses synchronization to the original data signal at the transmitting IWF.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for synchronizing backup receivers to network clock signals based on timing information from primary receivers protected by the backup receivers. In one exemplary embodiment, an interworking function (IWF) at an edge of a packet network comprises a primary receiver and a backup receiver. The primary receiver receives data packets and timing information from a packet network. The primary receiver interworks data from the data packets into a data signal that is based on a local clock signal. The primary receiver uses the timing information from the packet network to adjust the frequency of the local clock signal such that it is synchronous to a network clock signal, such as a clock signal at an IWF, referred to as the "transmitting IWF," that transmitted the data packets. In addition, the primary receiver from time-to-time provides timing information; such as a frequency control word, to the backup receiver, which uses such timing information to synchronize a clock signal of the backup receiver to the network clock signal upon an occurrence of a switchover from the primary receiver to the backup receiver. By using the timing information from the primary transceiver, the backup transceiver is able to synchronize its clock signal to the network clock signal in less time.

Figure 1:
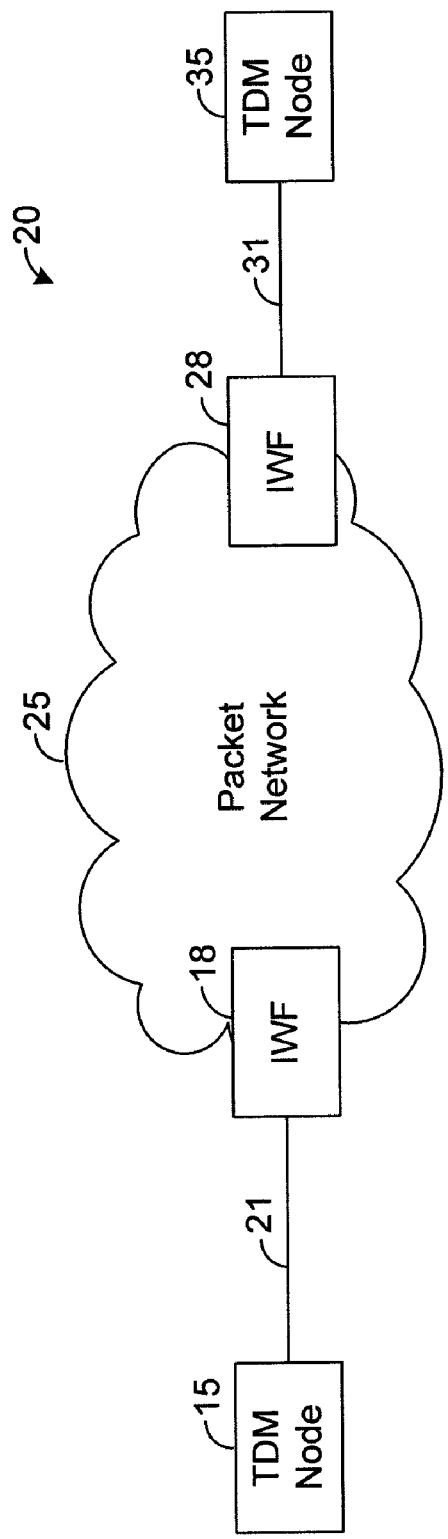
FIG. 1 is a block diagram illustrating an exemplary embodiment of a communication system.

FIG. 1 depicts an exemplary embodiment of a time division multiplexed (TDM) system 20 having an embedded packet network 25 for transporting data across a portion of the TDM system 20. In this regard, the system 20 comprises a TDM node 15 that is coupled to an interworking function (IWF) 18 of the packet network 25 via a data connection 21, such as at least one twisted pair or other type of conductive media. The TDM 15 transmits a TDM data signal, such as a DS1 or T1 signal, to the IWF 18 via the data connection 21. The IWF 18 interworks the data of such data signal into a plurality of data packets compatible with the packet network 25. In one exemplary embodiment, the network 25 is an Ethernet network, and the data packets are transmitted by the IWF 18 through the packet network 25 to an IWF 28 via applicable Ethernet protocols. However, other types of networks and protocols may be used in other embodiments.

As shown by FIG. 1, the IWF 28 is coupled to a TDM node 35 via a data connection 31, such as at least one twisted pair or other type of conductive media. The IWF 28 interworks the payload of the received data packets into a TDM data signal that is synchronous to the TDM data signal received by the IWF 18, and the IWF 28 transmits the TDM data signal to the TDM node 35. Since the TDM data signal transmitted by the IWF 28 is synchronous to the TDM data signal received by the TDM node 15, the presence of the packet network 25 within the system 20 is transparent to the TDM node 35.

To enable the IWF 28 to provide a TDM signal that is synchronous to the one received by the IWF 18, the IWF 18 is configured to provide timing information that is transmitted through the packet network 25 to the (WE 28. Various techniques may be used to convey the timing information to the IWF 28. For example, the timing information may be transmitted via timing packets, or the timing information may be embedded within the data packets or a control channel.

The timing information is indicative of timing relationships between a highly accurate clock signal generated by a primary reference clock (PRC) and a clock signal synchronous to the data signal received by the IWF 18. Using such timing information, the IWF 28 adjusts a local clock signal such that it is synchronous to the clock signal at the IWF 28. The timing of the TDM data signal transmitted by the IWF 28 is controlled based on the local clock signal such that it is synchronous to the TDM data signal received by the IWF 18.

Figure 2:
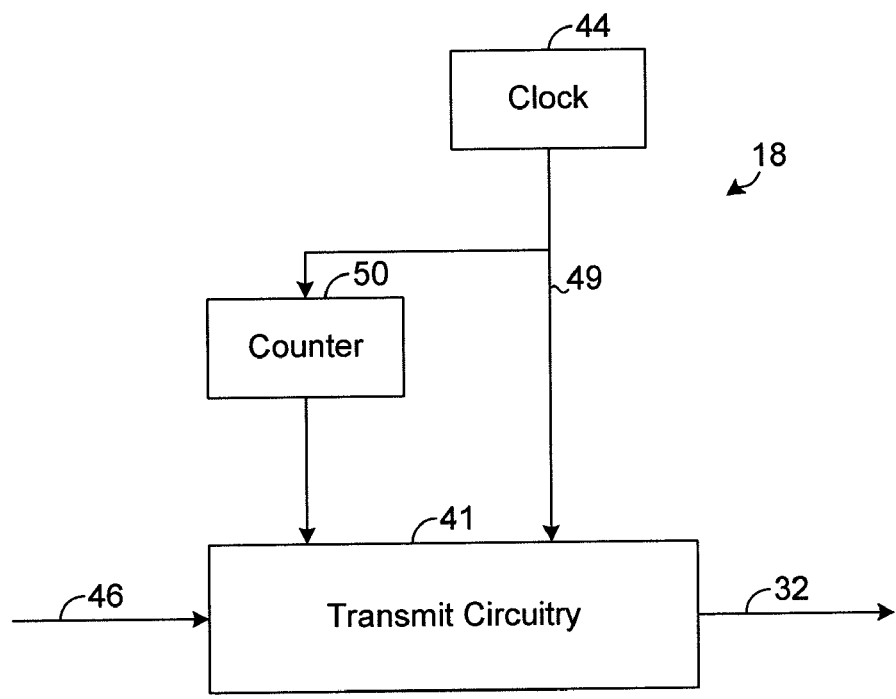
FIG. 2 is a block diagram illustrating an exemplary embodiment of an interworking function, such as is depicted by FIG. 1, for interworking a time division multiplexed (TDM) data signal into data packets for communication through a packet network.

FIG. 2 depicts an exemplary embodiment of the IWF 18. As shown by FIG. 2, the IWF 18 comprises transmit circuitry 41 and a clock 44. The transmit circuitry 41 receives a TDM data signal 46, such as a DS1 or T1 signal, from the TDM node 15 (FIG. 1) via the connection 21 (FIG. 1) and packetizes the data from such signal 46 into a plurality of data packets for transmission through the packet network 25 (FIG. 1). The transmit circuitry 41 transmits such data packets to the network 25 via a data signal 32, which is an Ethernet signal, but other protocols may be used in other embodiments. Note that the transmit circuitry 41 can be implemented in hardware or a combination of hardware with software and/or firmware. In addition, in one embodiment, the transmit circuitry 41 defines the data packets according to protocols in accordance with pseudo-wire emulation (PWE), although other protocols may be used in other embodiments.

The clock 44 produces a clock signal 49 for the transmit circuitry 41 and a counter 50. The clock signal 49 is either a primary reference clock (PRC) signal or a clock signal that is traceable to a PRC signal. As known in the art, a PRC signal is a highly accurate clock signal. It is often generated by an atomic clock or a clock that uses global positioning system (GPS) signals to achieve a high degree of accuracy. Further, a clock signal is generally traceable to a PRC signal when it is based on the PRC signal such that fluctuations in frequency of the PRC signal correspondingly appear in the frequency of the clock signal. Thus, a clock signal traceable to a PRC generally has the same degree of accuracy as the PRC signal. Exemplary techniques for providing a clock signal traceable to a PRC are described in commonly-assigned U.S. patent application Ser. No. 11/639,401, entitled "Systems and Methods for Enabling Clock Signal Synchronization," and filed on Dec. 14, 2006, which is incorporated herein by reference.

Based on the clock signal 49, the counter 50 produces timestamps for the transmit circuitry 41. The transmit circuitry 41, in accordance with PWE, is configured to insert, into each data packet, a timestamp indicative of the approximate time of reception by the transmit circuitry 41 of a particular bit in the data signal 46 and subsequently packetized into the data packet.

In addition to data packets, the transmit circuitry 41 also transmits packets, referred to herein as "timing packets," to the IWF 28 (FIG. 1). The circuitry 41 is configured to insert into each timing packet a timestamp that is used by the IWF 28 (FIG. 1) to synchronize a clock signal at the IWF 28 to the clock signal 49 at the IWF 18. Thus, the clock signal at the IWF 28 should have the same degree of accuracy as the highly accurate clock signal 49. In one exemplary embodiment, the transmit circuitry 41 inserts the current timestamp from the counter 50 into the timing packet such that this timestamp indicates the approximate time of transmission for the timing packet. Various types of protocols may be used for the timing packets. For example, in one embodiment, simple network time protocol (SNIP) is employed, but other types of protocols may be used in other embodiments. As will be described in more detail hereafter, the transmit circuitry 41 may be configured to transmit the timing packets to the IWF 28 (FIG. 1) periodically, randomly, and/or in response to requests from the IWF 28. Further, the timing packets may be transmitted via the same signal 32 as the data packets, although it is possible for the timing packets to be transmitted via a different channel than the data packets. In addition, if desired, more than one channel may be used to communicate the data packets and/or the timing packets.

Figure 3:
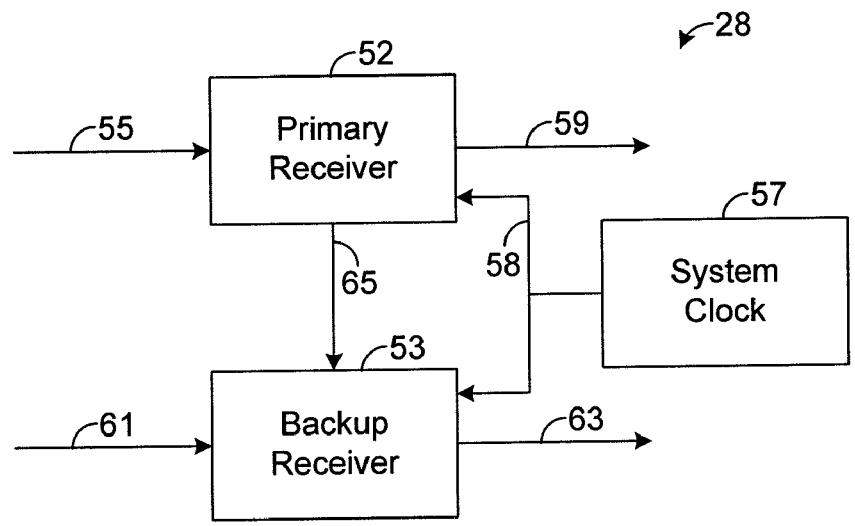
FIG. 3 is a block diagram illustrating an exemplary embodiment of an interworking function, such as is depicted by FIG. 1, for receiving the data packets transmitted from the interworking function depicted by FIG. 2.

FIG. 3 depicts an exemplary embodiment of the IWF 28. As shown by FIG. 3, the IWF 28 comprises a receiver 52, referred to hereafter as "primary receiver," and another receiver 53, referred to hereafter as "backup receiver." The primary receiver 52 is configured to receive the data packets and timing packets transmitted by the IWF 18 (FIG. 1) through the network 25. In one exemplary embodiment, the data packets and timing packets are received via a data signal 55, which is an Ethernet signal in one exemplary embodiment, but other protocols may be used in other embodiments. In addition, it is possible for the data packets and/or timing packets to be received via more than one channel.

The primary receiver 52 and the backup receiver 53 are each coupled to a local system clock 57 and configured to receive a clock signal 58 from this clock 57. The primary receiver 52 depacketizes the data packets received from the data signal 55 to recover the data originally in the TDM data signal 46 (FIG. 2) received by the IWF 18. The primary receiver 52 further transmits the recovered data via a TDM data signal 59 to the TDM node 35 (FIG. 1) via the data connection 31 (FIG. 1). The primary receiver 52 controls a timing of the TDM data signal 59 such that it is synchronous to the TDM data signal 46 (FIG. 2).

In response to a detection of an operational problem associated with the primary receiver 52, communication is switched from the primary receiver 52 to the backup receiver 53. Such a communication problem may be detected by the primary receiver 52 or the IWF 18 (FIG. 1). For example, the primary receiver 52 may detect an operational problem, and transmit a message through the network 25 for instructing the IWF 18 (FIG. 1) to switch communication to the backup receiver 53, which has a network address different than that for the primary receiver 52. In response, the IWF 18 is configured to change the destination address of each data packet and timing packet to identify the backup receiver 53 rather than the primary receiver 52. Therefore, the data packets and timing packets begin to be routed by the network 25 to the backup receiver 53 rather than the primary receiver 52 thereby switching communication from the primary receiver 52 to the backup receiver 53.

In another example, the IWF 18 detects the operational problem and initiates the backup switch. For example, the IWF 18 may determine that communication with the primary receiver 52 has been lost or degraded. In this regard, the IWF 18 may use a control channel, such as the Ethernet Operation, Administration, and Maintenance (OAM) control channel, to determine the health of the primary receiver 52. In another embodiment, the IWF 18 may determine that the communication has become degraded based on the number of retransmission requests received from the IWF 52 during a specified time period. Other techniques for determining when to switch to the backup receiver 53 are possible.

After a backup switch has occurred, the backup receiver 53 receives the data packets and timing packets via a data signal 61, which is an Ethernet signal in one exemplary embodiment, but other protocols may be used in other embodiments. Like the primary receiver 52 prior to the backup switch, the backup receiver 52 after the backup switch depacketizes the data packets received from the data signal 61 to recover the data originally in the TDM data signal 46 (FIG. 2) received by the IWF 18. The backup receiver 53 further transmits the recovered data via a TDM data signal 63 to the TDM node 35 (FIG. 1) via the data connection 31 (FIG. 1). Based in part on the timing packets and the clock signal 58, the backup receiver 53 controls a timing of the TDM data signal 63 such that it is synchronous to the TDM data signal 46 (FIG. 2). Preferably, synchronization with the original TDM data signal 46 is sufficiently maintained such that the switching of communication from the primary receiver 52 to the backup receiver 53 is transparent to the TDM node 35 (FIG. 1).

In this regard, the primary receiver 52 transmits a signal 65, referred to hereafter as a "timing signal," that includes timing information of how a clock signal local to the primary receiver 52 is being adjusted by the primary receiver 52 to maintain synchronization with a network clock signal, such as a clock signal at the IWF 18. Upon a communication switch to the backup receiver 53 (i.e., a "backup switch"), the backup receiver 53 uses the timing information from the timing signal 65 to adjust a clock signal local to the backup receiver 53 in order to synchronize this local clock signal to the network clock signal. The backup receiver 53 uses this local clock signal to synchronize the TDM data signal 63 to the original TDM data signal 46 (FIG. 2). By using the timing information, the time that elapses between the backup switch and synchronization with the original TDM data signal 46 is reduced. In one exemplary embodiment, a digital word, referred to herein as a "frequency control word," is passed from the primary receiver 52 to the backup receiver 53, and the backup receiver 53 uses this frequency control word to adjust the timing of its local clock signal. However, in other embodiments, other types of timing information may be used, and other synchronization techniques may be employed.

Figure 4:
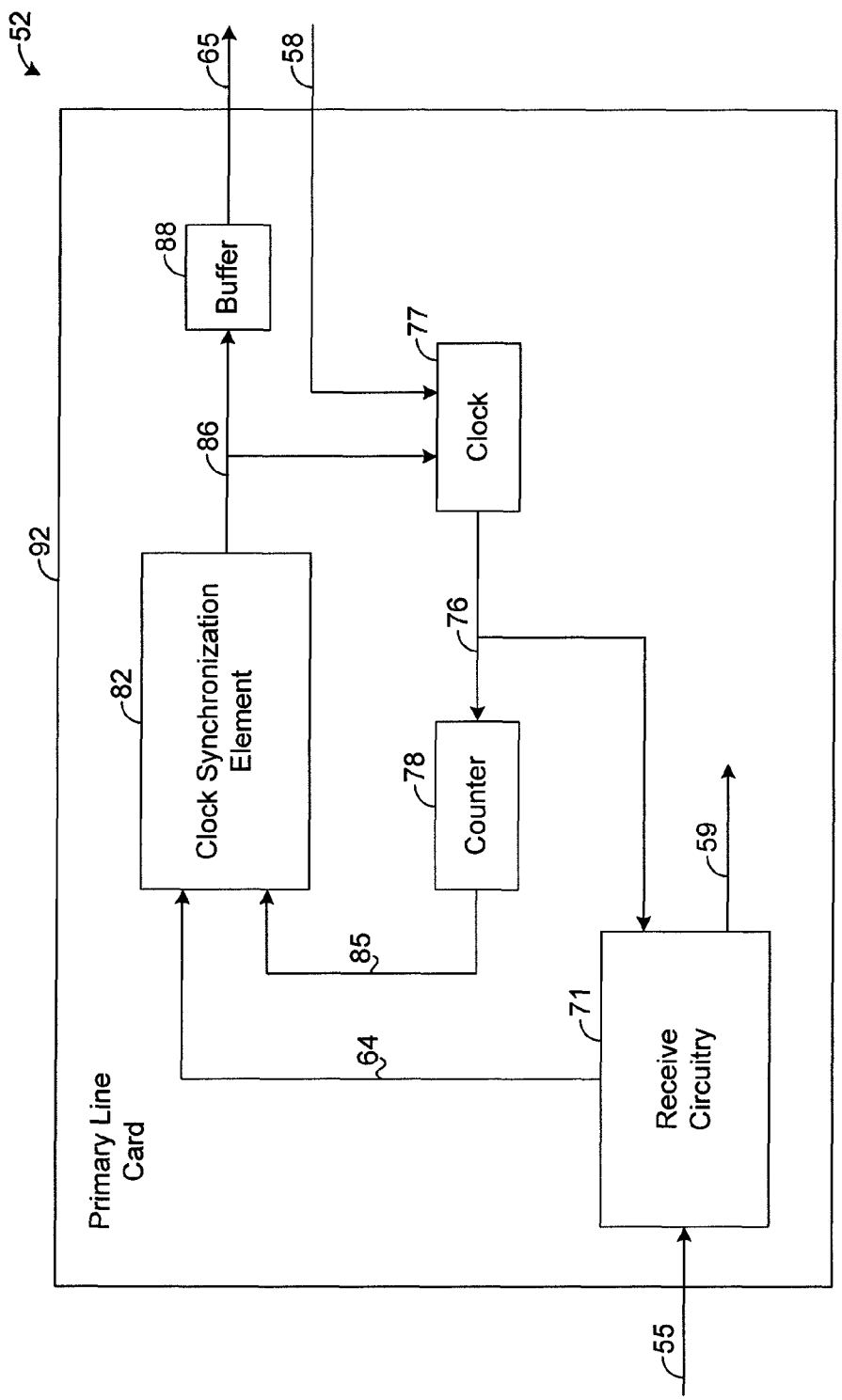
FIG. 4 is a block diagram illustrating an exemplary embodiment of a primary receiver, such as is depicted by FIG. 3.

FIG. 4 depicts an exemplary embodiment of the primary receiver 52. As shown by FIG. 4, the receiver 52 comprises receive circuitry 71, which can be implemented in hardware or a combination of hardware with software and/or firmware. The receive circuitry 71 is configured to receive timing packets via the signal 55 from the packet network 25 and to depacketize such packets. Timestamps 64 from the timing packets are used to control a clock synchronization element 82 such that a local receiver clock 77 generates a clock signal 76 that is synchronous to the clock signal 49 (FIG. 2) of the transmit IWF 18.

Note that, in other embodiments, the receiver 52 may receive timing information from another clock, such as a PRC at a location in the network 25 other than the IWF 18, and control the clock 77 such that the clock signal 76 is synchronous to this other clock rather than the clock 44 of the IWF 18. For illustrative purposes, it will be assumed hereafter that the clock signal 76 is synchronous to the clock signal 49 at the IWF 18.

The receive circuitry 71 also receives the data packets transmitted by the IWF 18. The payload and timestamps of the data packets are used to form the TDM data signal 59 that contains the same data and is synchronous to the TDM data signal 46 (FIG. 2). In this regard, the signal 59, which is based on the clock signal 76 and the timestamps of the received data packets, represents a regeneration of the original data signal 46 and shall be referred to hereafter as the "regenerated data signal 59." The receive circuitry 71 is able to keep the regenerated data signal 59 synchronous to the original data signal 46 since the receiver clock signal 76 remains synchronous to the transmitter clock signal 49. In this regard, the receive circuitry 71 uses the clock signal 76 as a frame of reference for synchronizing the regenerated data signal 59 to the original data signal 46.

In one exemplary embodiment, the clock synchronization element 82 is implemented in software and stored in memory (not specifically shown). In such an embodiment, the receiver 52 comprises a processing element (not shown), such as a digital signal processor (DSP) or a central processing unit, that can fetch and execute instructions of the element 82. Further, the element 82 can be stored on any computer-readable medium. In other embodiments, the clock synchronization element 82 can be implemented in hardware or any combination of hardware, software, and/or firmware.

A counter 78 receives the clock signal 76 and produces timestamps 85 based on the clock signal 76. Upon receiving a timing packet from the network 25, the receive circuitry 71 sends the timestamp 64 of such timing packet to the clock synchronization element 82, which also simultaneously receives a timestamp 85, referred to hereafter as the "receive timestamp 85," indicating the approximate time at which the timing packet was received by the receive circuitry 71. Based on the timestamps 64, 85, the clock synchronization element 82 is configured to track timing variations between the clock signal 49 at the IWF 18 and the clock signal 76 and to update the frequency of the clock 77, based on such timing variations, such that the clock signal 76 remains synchronous to the clock signal 49 (FIG. 2).

Various techniques may be used to update the frequency of the clock 77. In one exemplary embodiment, the clock 77 comprises a digital oscillator (not specifically shown in FIG. 4) that is controlled by a digital input 86, referred to as a frequency control word (fcw). For example, in one embodiment, the frequency of the clock 77 is proportional to the value of the frequency control word 86. Thus, providing the clock 77 with a frequency control word 86 having a higher value increases the frequency of the clock 77 and, hence, the clock signal 76. Further, providing the clock 77 with a frequency control word 86 having a lower value decreases the frequency of the clock 77 and, hence, the clock signal 76. Exemplary techniques for providing a frequency control word and controlling the clock 77 based on the received timing packets are described in commonly-assigned U.S. patent application Ser. No. 12/061,480, entitled "Systems and Methods for Passing Timing Information Over Packet Networks," and filed on Apr. 2, 2008, which is incorporated herein by reference.

Note that there is a finite amount of time that occurs from the time that the receiver 52 begins to receive timing packets to the time that clock signal 76 is synchronized to the clock signal 49 (FIG. 2) at the transmit IWF 18. According to the techniques described herein, this amount of time from reception of timing packets to synchronization is longer for the primary receiver 52 than the time between a backup switch and the backup receiver 53 achieving synchronization with the clock signal 49 at the transmit IWF 18.

As shown by FIG. 4, the primary receiver 52 has a buffer 88 that receives a frequency control word 86 as an input and transmits the timing signal 65 as an output. From time-to-time, the timing signal 65 is updated based on the input of the buffer 88. For example, in one exemplary embodiment, the buffer 88 is implemented as a latch (e.g., a flip-flop) that latches the frequency control word 86 from time-to-time thereby changing the value of the timing signal 65. Thus, the timing signal 65 transmits the value of the most recently latched frequency control word 86.

In one exemplary embodiment, the components of the primary receiver 52 reside on a single printed circuit board (PCB) 92, referred to as the "primary line card." However, other configurations of the receiver 52 are possible, and the receiver 52 may be implemented on more than one PCB, if desired.

Figure 5:
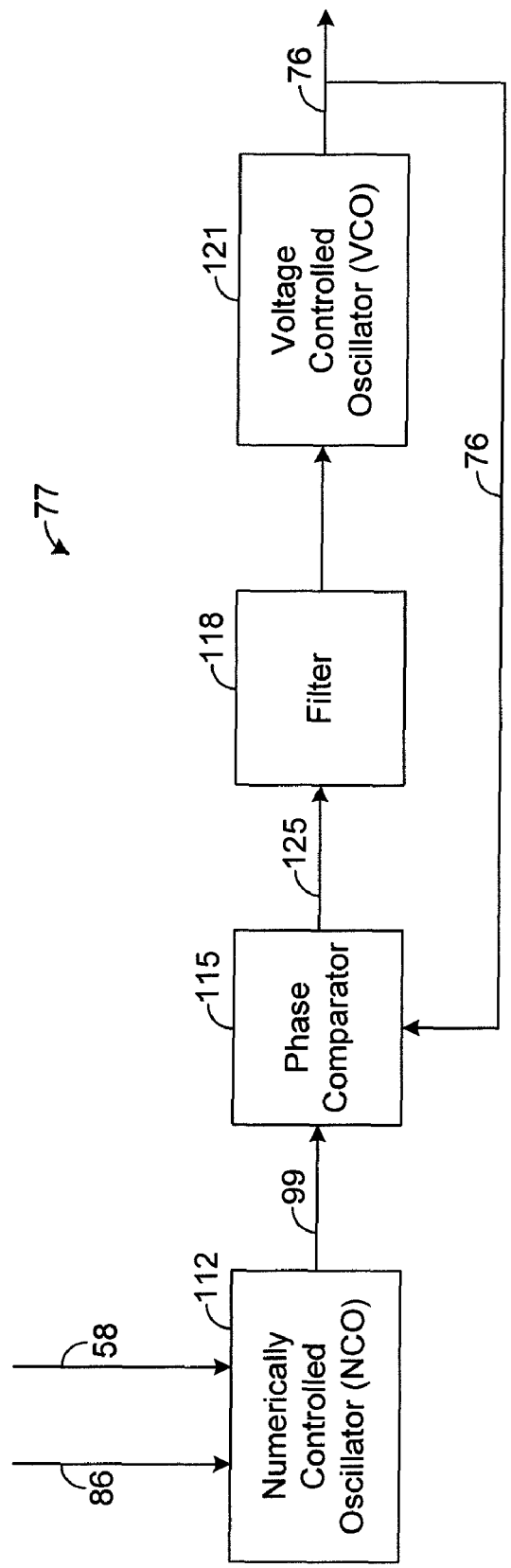
FIG. 5 is a block diagram illustrating an exemplary embodiment of a clock, such as is depicted by FIG. 4.

FIG. 5 depicts an exemplary embodiment of the clock 77. The exemplary clock 77 shown by FIG. 5 has a numerically controlled oscillator (NCO) 112, a phase comparator 115, a filter 118, and a voltage controlled oscillator (VCO) 121. The NCO 112 receives a frequency control word 86 transmitted by the clock synchronization element 82 (FIG. 4) and the clock signal 58 transmitted by the system clock 57 (FIG. 3), and the NCO 112 transmits a gapped clock signal 99 based on the frequency control word 86 and the clock signal 58. In this regard, the NCO 112 counts edges of the clock signal 58 and toggles the clock signal 99 every n counts, where n is a variable equal to the value of the frequency control word 86.

The phase comparator 115 compares the clock signals 76, 99 to determine whether the two clock signals 76, 99 are phase aligned, and provides a pulse width modulation (PWM) control signal 125 for controlling the VCO 121 in an effort to keep the clock signals 76, 99 aligned in phase. The PWM control signal 125 is filtered by the filter 118 before being received by the VCO 121. Thus, the frequency control word 86, which is based on the timing packets received from the IWF 18 (FIG. 1), updates the clock signal 76 such that it remains synchronous to the clock signal 49 (FIG. 2) at the IWF 18. Note that, in other embodiments, other types of clocks may be used to provide the clock signal 76.

Figure 6:
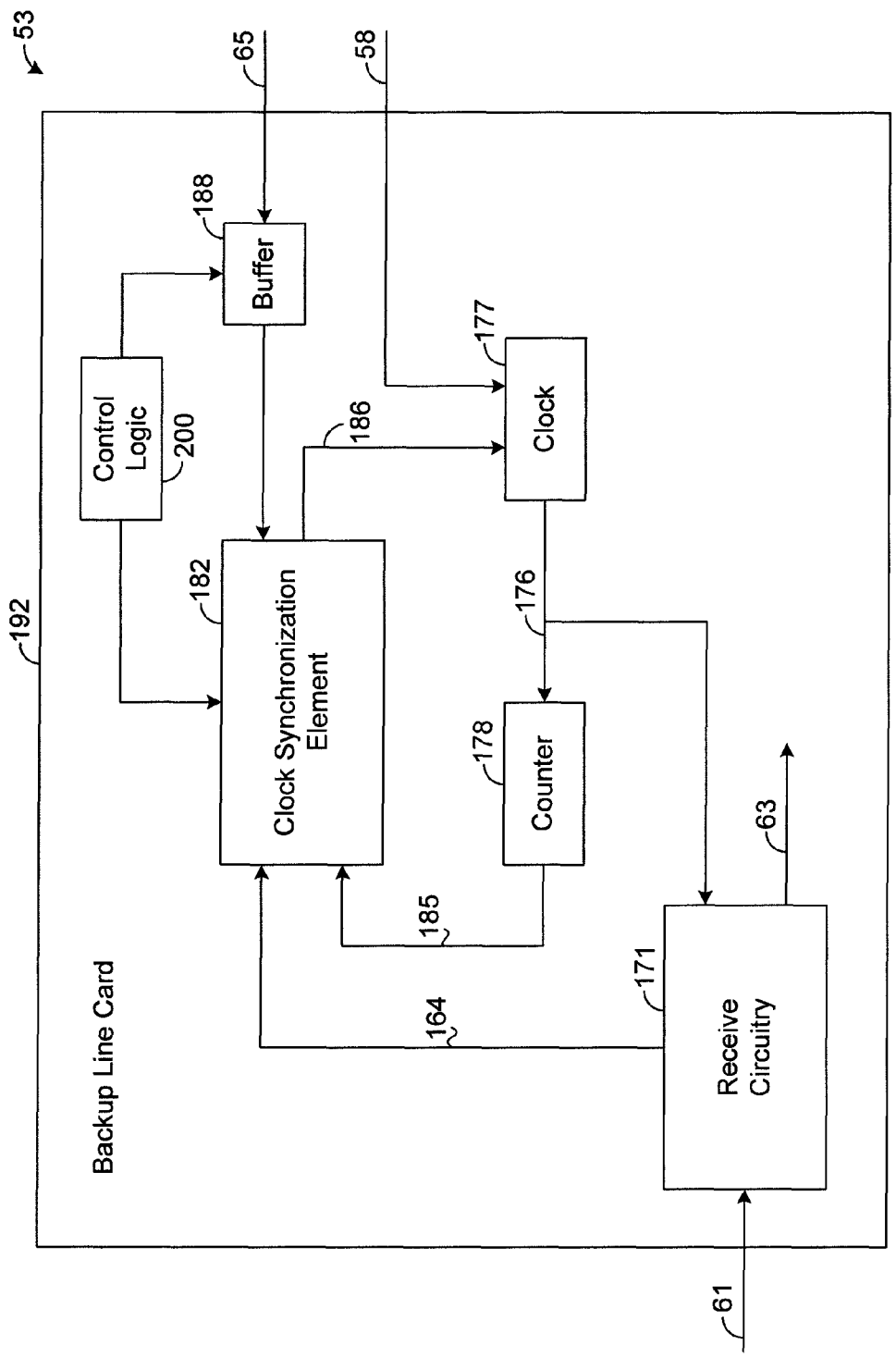
FIG. 6 is a block diagram illustrating an exemplary embodiment of a backup receiver, such as is depicted by FIG. 3.

FIG. 6 depicts an exemplary embodiment of the backup receiver 53. Similar to the primary receiver 52, the backup receiver 53 has receive circuitry 171, a clock 177, a counter 178, and a clock synchronization element 182. Except as otherwise described herein, the receive circuitry 171, clock 177, counter 178, and clock synchronization element 182 are configured identically to the receive circuitry 71, clock 77, counter 78, and clock synchronization element 82, respectively, of the primary receiver 52.

When communication is switched from the primary receiver 52 to the backup receiver 53, the backup receiver 53 begins processing the data packets and timing packets received from the IWF 18 (FIG. 1) according to the same techniques previously used by the primary receiver 52, except as otherwise described herein. Thus, receive circuitry 171 provides timestamps 164 from the timing packets to the clock synchronization element 182, and the counter 178 provides receive timestamps 185 indicating when the timing packet carrying the timestamp 164 was received by the receive circuitry 171. Based on the timestamps 164 and the receive timestamps 185, the clock synchronization element 182 provides a frequency control word 186. The clock 177 uses the frequency control word 186 and the clock signal 58 from the system clock 57 (FIG. 3) to provide a clock signal 176 that is synchronous to the clock signal 49 (FIG. 2) at the IWF 18. The receive circuitry 171 uses such clock signal 176 to provide a TDM data signal 63 that is synchronous to the TDM data signal 46 (FIG. 2) received by the IWF 18 and carries the same data as the TDM data signal 46. In this regard, the receive circuitry 171 depacketizes the data packets received from the IWF 18 and modulates the TDM data signal 63 with the payload of such data packets.

In one exemplary embodiment, the components of the backup receiver 53 reside on a single printed circuit board (PCB) 192, referred to as the "backup line card." However, other configurations of the receiver 53 are possible, and the receiver 53 may be implemented on more than one PCB, if desired.

If desired, the primary line card 92 and the backup line card 192 may each be inserted into a respective slot of chassis (not shown) for holding telecommunication line cards. Further, the system clock 57 may reside on yet another PCB inserted into a slot of such chassis. In such an embodiment, the clock signal 58 and the timing signal 65 may be communicated across a backplane of the chassis. However, other configurations are possible in other embodiments. For example, it is possible for the primary line card 92 and the backup line card 192 to be coupled to one another directly via a conductive medium that carries the timing signal 65 such that the signal 65 is not communicated across a chassis backplane. Similarly, the clock signal 58 may be communicated across a conductive medium extending to each of the line cards 92, 192 without being communicated across a chassis backplane. Yet other configurations are possible in other embodiments.

As shown by FIG. 6, the backup receiver 53 comprises a buffer 188, such as a latch, that stores the most recently received value of the timing signal 65. Such value represents the last frequency control word 86 latched into the buffer 88 of the primary receiver 52.

Control logic 200 controls the operation of the buffer 188 and the clock synchronization element 182. In this regard, the control logic 200 is configured to latch new values into the buffer 188 periodically or when the control logic 200 determines that the value of the timing signal 65 has changed. The control logic 200 also is configured to control initialization of the frequency control word 186 output by the clock synchronization element 182. In one exemplary embodiment, the control logic 200 is implemented in software, but the control logic 200 may be implemented in hardware, software, firmware, or any combination thereof.

The operation of the backup receiver 53 after a backup switch is essentially the same as the operation of the primary receiver 52 before the backup switch except that the initial frequency control word 186 used by the clock synchronization element 182 is based on a frequency control word 86 provided by the primary receiver 52. In particular, the initial value of the frequency control word 186 transmitted by the clock synchronization element 182 to the clock 177 is set to equal the frequency control word value in the buffer 188. Thus, the clock 177 is effectively primed with a frequency control word that matches a recent frequency control word 86 used by the primary receiver 52 prior to the backup switch.

Accordingly, it takes less time for the clock 177 to synchronize with the clock 44 (FIG. 2) at the IWF 18 than would otherwise be required without the use of timing information from the primary receiver 52.

Indeed, if the clock 177 uses the same input (e.g., the same frequency control word and the same clock signal 58) and is configured the same as the clock 77 of the primary receiver 52, then the output of the clocks 177, 77 should be the same. Accordingly, since the clock 177 initially uses a recent frequency control word from the primary receiver 52 (noting that the frequency control word 86 changes relatively slowly) and since this frequency control word has already been set by the primary receiver 52 to produce an output of the clock 77 that is synchronous to the clock signal 49 at the IWF 18, then such frequency control word should produce an output of the clock 177 that is synchronous to the clock signal 49 as well. Further, once the frequency control word 186 has been initialized to match the value stored in the buffer 188, the frequency control word 186 is then updated by the clock synchronization element 182 based on the timestamps 164 such that the clock signal 176 remains synchronous to the clock signal 49 at the IWF 18 over time.

An exemplary use and operation of the system 20 will now be described with particular reference to FIGS. 7 and 8.

Referring to FIG. 2, the IWF 18 receives a TDM data signal 46 from the TDM node 15 (FIG. 1). The transmit circuitry 41 is configured to packetize data from the data signal 46 into a plurality of data packets and to transmit such data packets through the packet network 25 to the IWF 28. The transmit circuitry 41 includes in each data packet a timestamp indicative of a time relative to the clock signal 49 that the payload of the data packet is received by the transmit circuitry 41. The transmit circuitry 41 also transmits timing packets to the IWF 28 and inserts into each timing packet a timestamp indicative of a time of transmission of the timing packet from the transmit circuitry 41.

Initially, the data packets and timing packets are received by the primary receiver 52 (FIG. 4). The receive circuitry 71 of the primary receiver 52 receives the data packets and interworks the payload of such data packets into the TDM data signal 59, as shown by blocks 205 and 207 of FIG. 7. Further, the receive circuitry 71 controls the timing of the TDM data signal 59 based on the timestamps in the received data packets and the clock signal 76 such that the TDM data signal 59 is synchronous to the original TDM data signal 46 from which the data packets are derived.

In addition, the timing packets are used to keep the clock signal 76 synchronous to the clock signal 49 at the IWF 18 on which the timestamps of the data packets are based. In this regard, the clock synchronization element 82 of the primary receiver 53 provides frequency control words 86 that are controlled based on the timestamps 64 from the timing packets. Such frequency control words 86 control the frequency of the clock 77 such that the clock signal 76 remains synchronous to the clock signal 49 at the IWF 18. This clock signal 76 serves as a reference for using the timestamps from the data packets to keep the TDM data signal 59 synchronous to the original TDM data signal 46 at the IWF 18.

Figure 7:
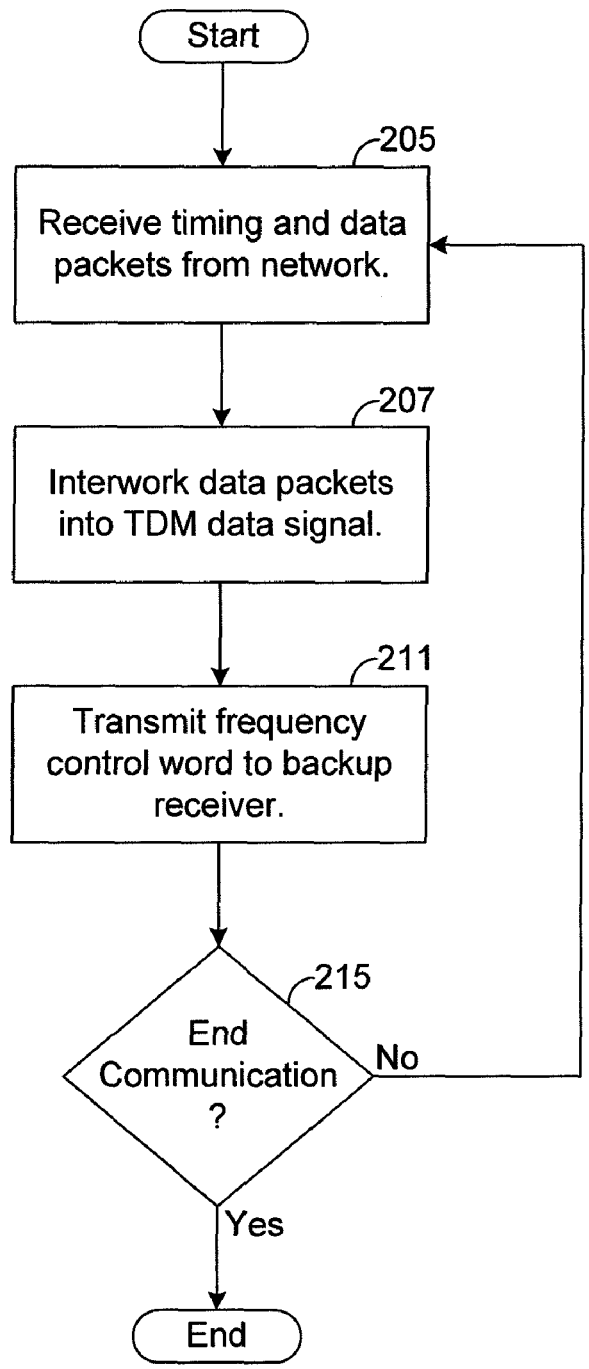
FIG. 7 is a flow chart illustrating an exemplary operation of a primary receiver, such as is depicted by FIG. 4.

As shown by block 211 of FIG. 7, the primary receiver 52 from time-to-time transmits to the backup receiver 53 the frequency control word 86 currently being used to control the clock 77. For example, in block 211, the value of the frequency control word 86 may be latched or otherwise stored into the buffer 88 so that the timing signal 65 is updated to indicate the current value of the frequency control word 86.

The backup receiver 53 stores the most recently transmitted frequency control word in the buffer 188, as will be described in more detail hereafter.

As shown by block 215, the primary receiver 52 determines when communication is to cease. Such decision may occur in response to an operational problem that causes the communication being handled by the primary receiver 52 to be switched to the backup receiver 53. However, the decision in block 215 may be based on other factors. If a "no" determination is made in block 215, then the primary receiver 52 continues to receive and process the data packets and the timing packets transmitted by the IWF 18.

At some point, an operational problem may occur that causes communication to be switched from the primary receiver 52 to the backup receiver 53. For example, the primary receiver 52 may detect an operational problem and initiate a backup switch by instructing the IWF 18 to begin transmitting the data packets and the timing packets to the backup receiver 53. In another example, the primary receiver 52 fails, and the IWF 18 discovers that it can no longer communicate with the primary receiver 53. In response, the IWF 18 initiates a backup switch and begins transmitting the data packets and timing packets to the backup receiver 53.

Figure 8:
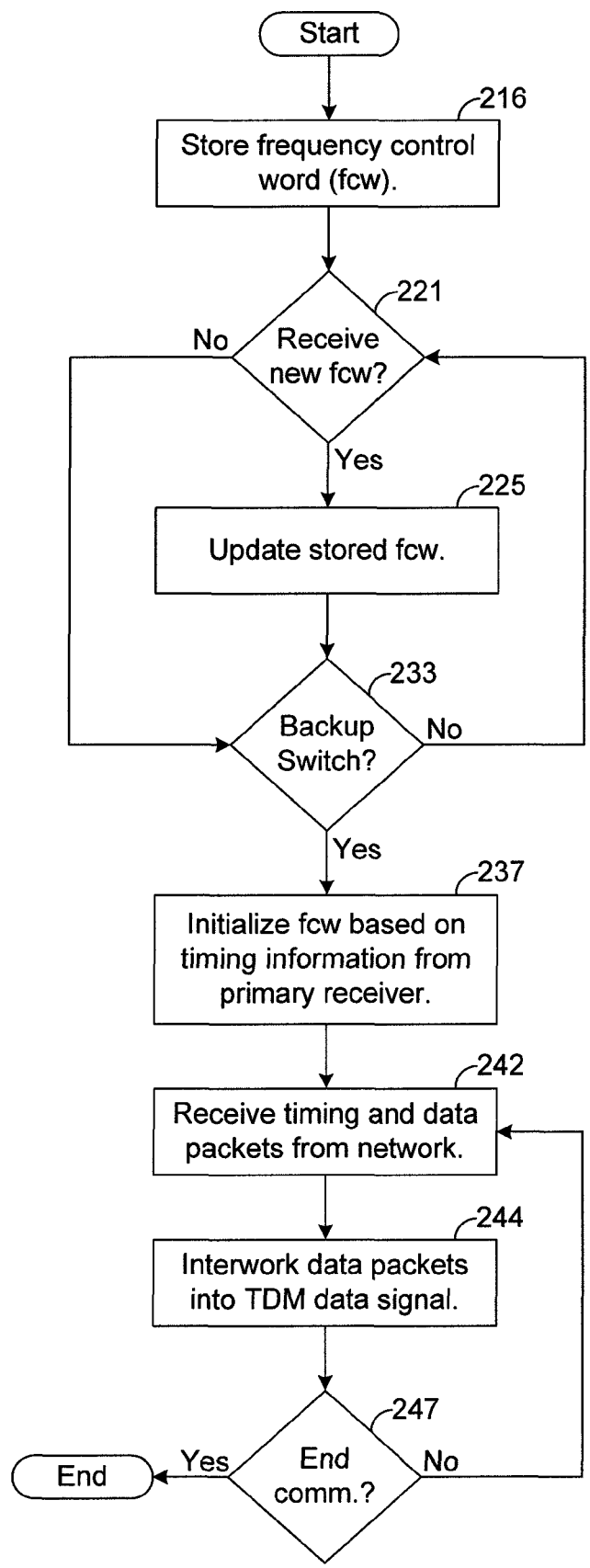
FIG. 8 is a flow chart illustrating an exemplary operation of a backup receiver, such as is depicted by FIG. 6.

As shown by block 216 of FIG. 8, the first frequency control word 86 transmitted to the backup receiver 53 prior to the backup switch is stored in the buffer 188. Thereafter, until the occurrence of the backup switch that switches communication from the primary receiver 52 to the backup receiver 53, the control logic 200 (FIG. 6) determines whether a new value of the timing signal 65 has been received, as shown by block 221 of FIG. 8. If so, the receiver 53 stores the new value of the timing signal 65, representing a new frequency control word, into the buffer 188 overwriting the previous value stored in the buffer 188, as shown by block 225.

The control logic 200 determines when a backup switch has occurred, as shown by block 233. Such a determination could be effectuated in a variety of ways. For example, the control logic 200 could detect that a backup switch has occurred when the clock synchronization element 182 begins receiving timestamps 164 from timing packets received by the backup receiver 53. Alternatively, the control logic 200 may communicate with the receive circuitry 171 and determine that a backup switch has occurred when the receive circuitry 171 begins receiving data packets and/or timing packets from the IWF 18. Other techniques for determining when a backup switch has occurred are possible, such as by receiving a control message from the primary receiver 52 or the IWF 18.

Once a backup switch is determined to have occurred, the control logic 200 is configured to control the clock synchronization element 182 such that the frequency control word 186 output by the clock synchronization control element 182 is initialized based on timing information (e.g., a frequency control word) received from the primary receiver 52, as shown by block 237. In particular, the control logic 200 controls the clock synchronization element 182 such that the frequency control word 186 output by the clock synchronization element 182 is initialized to the value stored in the buffer 188, which represents the most recent frequency control word transmitted from the primary receiver 52. Thereafter, adjustment of the frequency control word 186 occurs in the ordinary course based on the timestamps 164 of the timing packets received from the IWF 18. By initializing the frequency control word 186 based on the timing information from the primary receiver 52, the time from the occurrence of the backup switch to synchronization of the clock signal 176 with the clock signal 49 at the IWF 18 is reduced.

As shown by block 242 and 244, once the backup switch occurs, the receive circuitry 171 of the backup receiver 53 receives the data packets transmitted by the IWF 18 and interworks the payload of such data packets into the TDM data signal 63. Further, the receive circuitry 171 controls the timing of the TDM data signal 63 based on the timestamps in the received data packets and the clock signal 176 such that the TDM data signal 63 is synchronous to the original TDM data signal 46 from which the data packets are derived.

As shown by block 247, the processing of the data packets and timing packets by the backup receiver 53 continues until a determination is made that such processing is to cease. The decision to stop the processing of data packets and timing packets may be based on a variety of factors. For example, once the operational problem associated with the primary receiver 52 has been addressed, communication may be switched from the backup receiver 53 back to the primary receiver 52.

As described above, timing information pertaining to the timing of the clock signal 49 at the IWF 18 may be transmitted to the IWF 28 in timing packets. However, such timing information may be communicated via other techniques in other embodiments, such as embedding the timing information within the data packets transmitted by the IWF 18. Moreover, various modifications and changes to the exemplary embodiments described above would be apparent to one of ordinary skill in the art upon reading this disclosure.

Now, therefore, the following is claimed:

1. A communication system, comprising:
a first receiver coupled to a packet network, the first receiver configured to receive data packets and timing information from the packet network, the first receiver configured to depacketize the data packets received by the first receiver thereby recovering first data and to transmit the first data via a first data signal, the first receiver further configured to control a timing of the first data signal based on a first clock signal and to control a timing of the first clock signal based on the timing information received by the first receiver such that the first clock signal is synchronous to a network clock signal; and
a backup receiver configured to receive timing information from the first receiver prior to a backup switch for switching communication from the first receiver to the backup receiver, the backup receiver configured to receive data packets and timing information from the packet network after the backup switch, the backup receiver configured to depacketize the data packets received by the backup receiver thereby recovering second data and to transmit the second data via a second data signal, the backup receiver further configured to control a timing of the second data signal based on a second clock signal and to control a timing of the second clock signal based on the timing information received by the backup receiver from the packet network and based on the timing information received by the backup receiver from the first receiver prior to the backup switch such that the second clock signal is synchronous to the network clock signal.

2. The system of claim 1, wherein the timing information received by the backup receiver from the first receiver comprises a frequency control word.

3. The system of claim 2, wherein the first receiver comprises a first digital oscillator configured to generate the first clock signal, and wherein the first receiver is configured to control the first digital oscillator based on the frequency control word.

4. The system of claim 3, wherein the backup receiver comprises a second digital oscillator configured to generate the second clock signal, and wherein the backup receiver is configured to control the second digital oscillator based on the frequency control word.

5. The system of claim 1, wherein the backup receiver is configured to receive timing packets from the network, the timing packets comprising the timing information received by the backup receiver.

6. The system of claim 5, wherein each of the timing packets comprises a timestamp indicative of a time of transmission of the respective timing packet relative to the network clock signal.

7. The system of claim 6, further comprising an interworking function configured to receive a time division multiplexed (TDM) data signal and to interwork, based on the network clock signal, the first and second data from the TDM data signal into the data packets received by the first receiver and the data packets received by the backup receiver, wherein the interworking function is configured to transmit the timing packets through the network, and wherein the first data signal and the second data signal are synchronous to the TDM data signal.

8. A communication system, comprising:
a first interworking function (IWF) coupled to a packet network, the first interworking function configured to receive a first time division multiplexed (TDM) data signal and to interwork data from the first TDM data signal into a plurality of data packets, the first IWF configured to transmit the plurality of data packets through the packet network, each of the data packets comprising a respective time value relative to a first clock signal; and
a second interworking function (IWF) coupled to the packet network, the second interworking function configured to receive each of the plurality of data packets and first timing information from the packet network, the second IWF having a first receiver and a backup receiver, the first receiver configured to receive at least one of the data packets prior to a backup switch for switching communication from the first receiver to the backup receiver, the first receiver configured to interwork data from the at least one data packet received by the first receiver into a second TDM data signal and to control a timing of the second TDM data signal based on a second clock signal such that the second TDM data signal is synchronous to the first TDM data signal, the first receiver further configured to control a timing of the second clock signal based on the first timing information such that the second clock signal is synchronous to the first clock signal, the backup receiver configured to receive at least one of the data packets after the backup switch, the backup receiver configured to interwork data from the at least one data packet received by the backup receiver into a third TDM data signal and to control a timing of the third TDM data signal based on a third clock signal such that the third TDM data signal is synchronous to the first TDM data signal, the backup receiver further configured to control a timing of the third clock signal based on second timing information such that the third clock signal is synchronous to the first clock signal, wherein the second timing information is transmitted from the first receiver to the backup receiver prior to the backup switch.

9. The system of claim 8, wherein the second timing information comprises a frequency control word.

10. The system of claim 8, wherein the backup receiver comprises a first digital oscillator configured to generate the third clock signal, wherein the backup receiver is configured to control the first digital oscillator based on a first frequency control word, and wherein the first frequency control word is based on the second timing information.

11. The system of claim 10, wherein the backup receiver is configured to initialize the first frequency control word after the backup switch based on the second timing information.

12. The system of claim 10, wherein the first receiver comprises a second digital oscillator configured to generate the second clock signal, wherein the first receiver is configured to control the second digital oscillator based on a second frequency control word, and wherein the first frequency control word is based on the second frequency control word.

13. The system of claim 8, wherein the first interworking function is configured to transmit timestamps relative to the first clock signal, and wherein the second interworking function is configured to control the timing of the third clock signal based on the timestamps.

14. A communication system, comprising:
a first receiver configured to receive data packets from a packet network and to transmit a first data signal based on the data packets and a first clock signal, the first receiver having a first digital oscillator configured to generate the first clock signal, the first receiver further configured to control the first digital oscillator based on a frequency control word; and
a backup receiver configured to protect communication of the first receiver, the backup receiver configured to receive data packets after a switch of the communication from the first receiver to the backup receiver, the backup receiver configured to transmit a second data signal based on a second clock signal and the data packets received by the backup receiver, the backup receiver having a second digital oscillator configured to generate the second clock signal, the backup receiver configured to receive from the first receiver the frequency control word and to control the second digital oscillator based on the frequency control word.

15. The system of claim 14, wherein the first receiver is configured to control the first digital oscillator such that the first clock signal is synchronous to a third clock signal, and wherein the backup receiver is configured to control the second digital oscillator such that the second clock signal is synchronous to the third clock signal.

16. The system of claim 15, wherein the first receiver is configured to receive first timing information from the packet network and to control the first digital oscillator based on the first timing information, and wherein the backup receiver is configured to receive second timing information from the packet network and to control the second digital oscillator based on the second timing information.

17. The system of claim 16, wherein the first timing information comprises timestamps relative to the third clock signal, and wherein the second timing information comprises timestamps relative to the third clock signal.

18. A communication method, comprising the steps of:
receiving, via a first receiver, first data packets and first timing information from a packet network;
generating a first clock signal via a first digital oscillator;
controlling a timing of a first clock signal based on the first timing information and at least one frequency control word such that the first clock signal is synchronous to a second clock signal, the first timing information based on the second clock signal;
interworking, via the first receiver, data from the first data packets to a first time division multiplexed (TDM) data signal;
controlling a timing of the first TDM data signal based on the first clock signal;
switching communication from the first receiver to a backup receiver;
receiving, via the backup receiver subsequent to the switching step, second data packets and second timing information from the packet network;
generating a third clock signal via a second digital oscillator;
controlling a timing of the third clock signal based on the second timing information and the at least one frequency control word such that the third clock signal is synchronous to the second clock signal, the second timing information based on the second clock signal;
interworking, via the backup receiver, data from the second data packets to a second time division multiplexed (TDM) data signal; and
controlling a timing of the second TDM data signal based on the third clock signal.

19. The method of claim 18, further comprising the step of transmitting the at least one frequency control word from the first receiver to the backup receiver.

20. The method of claim 18, wherein the first timing information comprises a timestamp relative to the second clock signal, and wherein the second timing information comprises a timestamp relative to the second clock signal.

* * * * *